United States Patent [19]

Imus

[11] Patent Number: 5,368,419
[45] Date of Patent: Nov. 29, 1994

[54] APPARATUS FOR IMPLANTING LATENT INSECTICIDE

[76] Inventor: Robert E. Imus, 3535 Via Flores, Soquel, Calif. 95073

[21] Appl. No.: 3,503

[22] Filed: Jan. 12, 1993

[51] Int. Cl.$^5$ ............................................. B23B 41/00
[52] U.S. Cl. ...................................... 408/67; 144/364; 144/380; 408/72 R; 408/137; 408/241 R
[58] Field of Search ................. 408/56, 67, 72 R, 113, 408/137, 138, 241 R; 144/380, 364, 365

[56] References Cited

U.S. PATENT DOCUMENTS

| | | | |
|---|---|---|---|
| 1,012,207 | 12/1911 | Kolossvary et al. | 427/291 |
| 3,948,708 | 4/1976 | Doerer | 144/380 |
| 4,206,793 | 6/1980 | Kipp | 144/325 |
| 4,453,868 | 6/1984 | Winslow | 408/138 |
| 4,565,470 | 1/1986 | Karlsson | 408/72 R |
| 4,596,717 | 6/1986 | Herbert et al. | 144/364 |

*Primary Examiner*—Daniel W. Howell
*Attorney, Agent, or Firm*—Harris Zimmerman

[57] ABSTRACT

A method and apparatus for arresting structural termite infestation while eliminating the risk of poison exposure to occupants of the structure includes a power tool for drilling holes in wood members of a structure, implanting pellets of termite poison within the drilled holes, and sealing the holes. The tool includes a tubular body portion joined to a storage portion that stores a plurality of packages of pellets of termite poison. A platen assembly is secured to the storage portion and adapted to impinge on a wood member of a structure. The tubular body encloses a reversible drive motor connected through a gear train to rotate and translate the drill assembly reciprocally in a guideway. Cellulose balls impregnated with poison or insecticide or flagellacidal agents are grouped in loads, each load packaged and disposed in the tool parallel to the guideway, with a plug cork is disposed at the proximal end of each load. The method of the invention includes forming a hole in a wood member, placing pellets containing insect killing agents within the hole and sealing the hole so that no poison can escape. The insect killing agents remain latent and enclosed within the wood member, so that occupants of the structure are protected from any toxic contact and only insect infestation can gain access to it. The method of the invention also includes prepackaging termite killing agents as a load or charge comprising a plurality of pellets in axial alignment with a plug cork disposed at the proximal end of the charge. The method also includes dimensioning the pellets and plug cork with respect to a drilled hole so that the pellets are implantable in the drilled hole and the plug cork seals the drilled hole to retain any toxic substances for long-term protection from termite-caused damage.

20 Claims, 4 Drawing Sheets

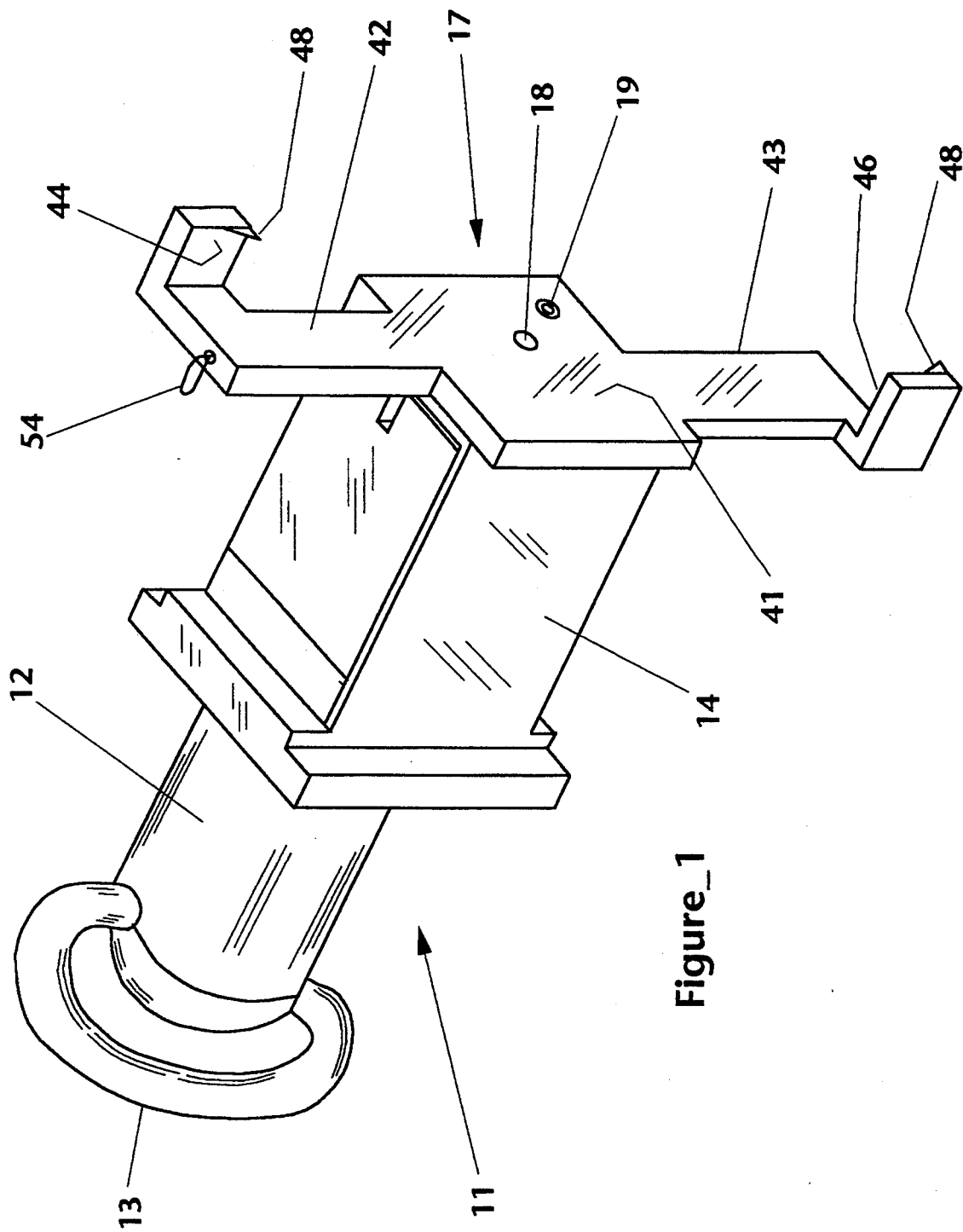
Figure_1

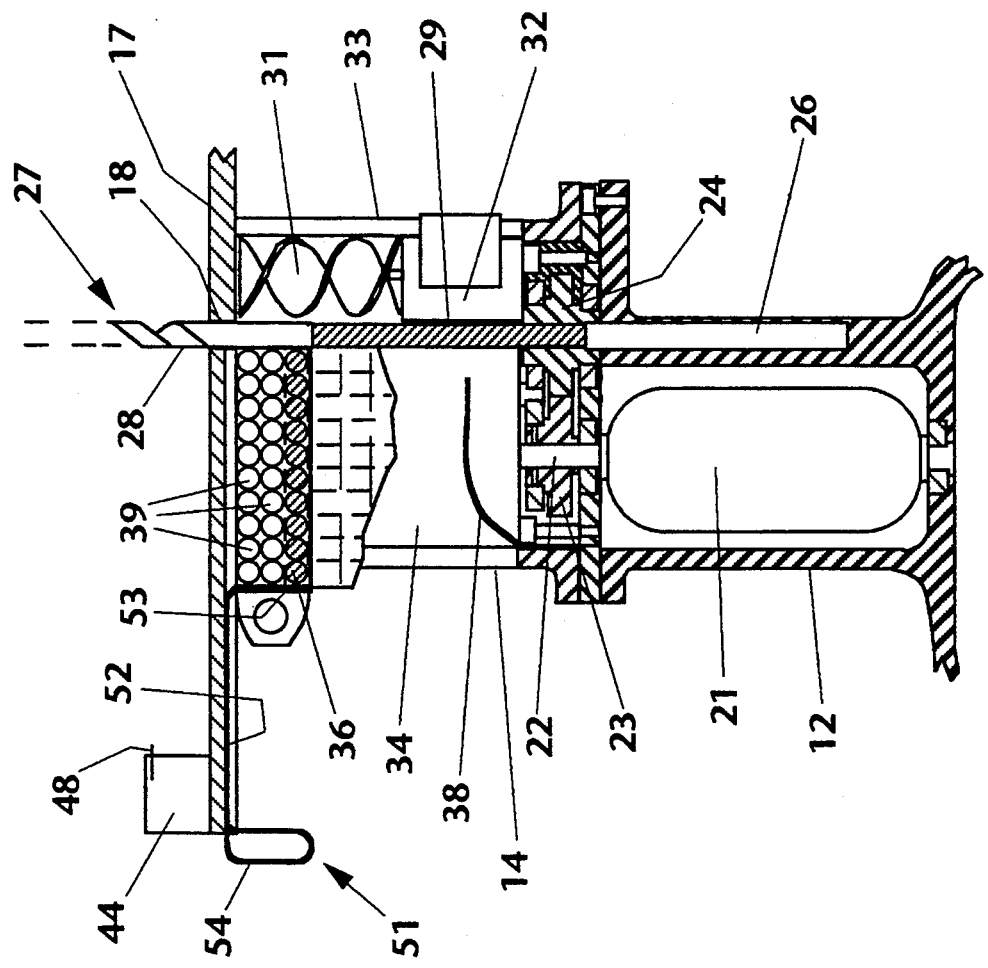
Figure_3
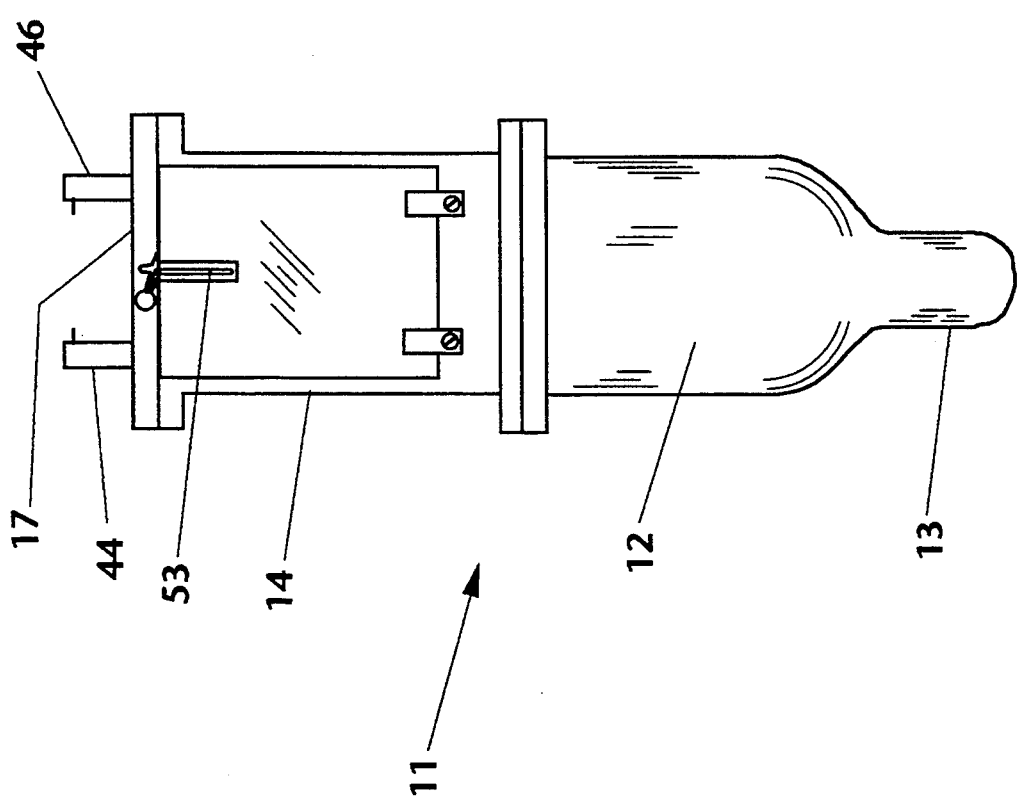
Figure_2

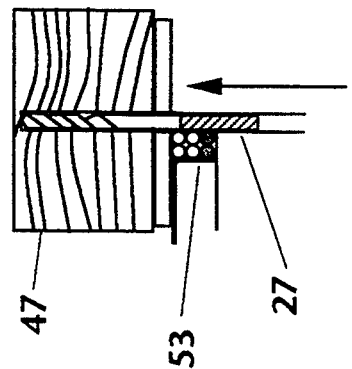
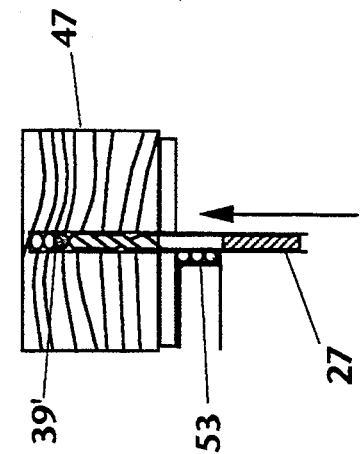
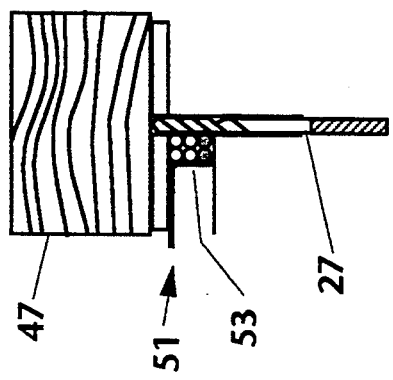
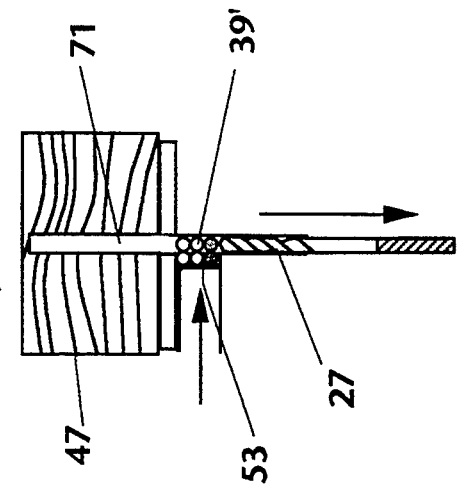
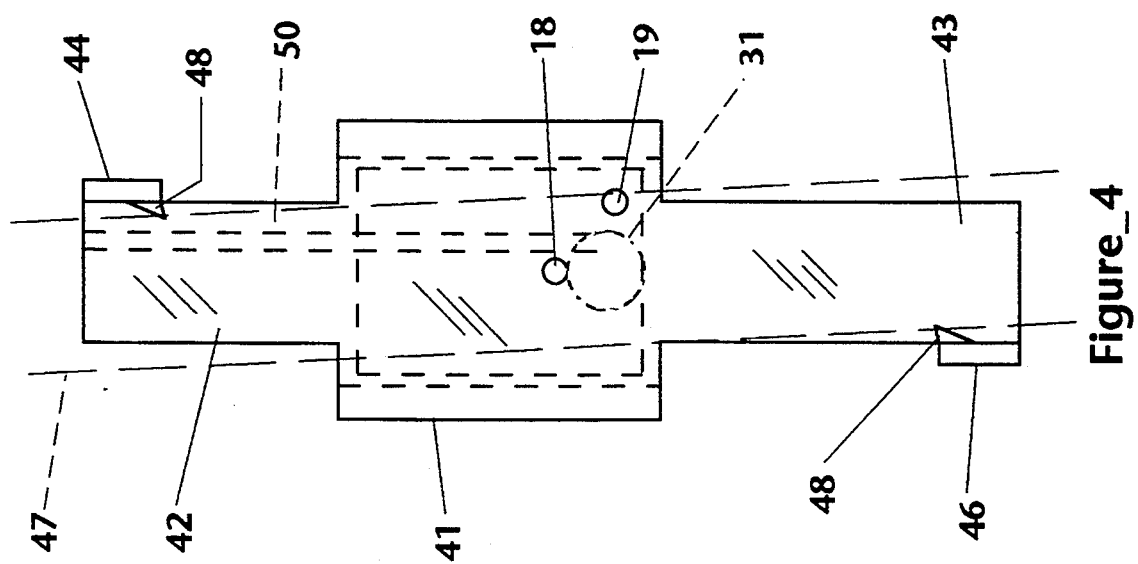

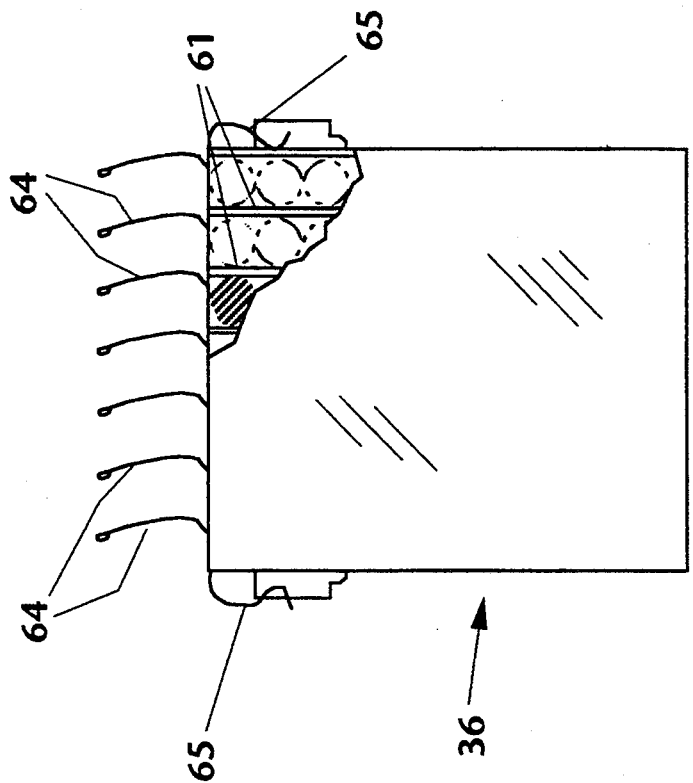
Figure_6
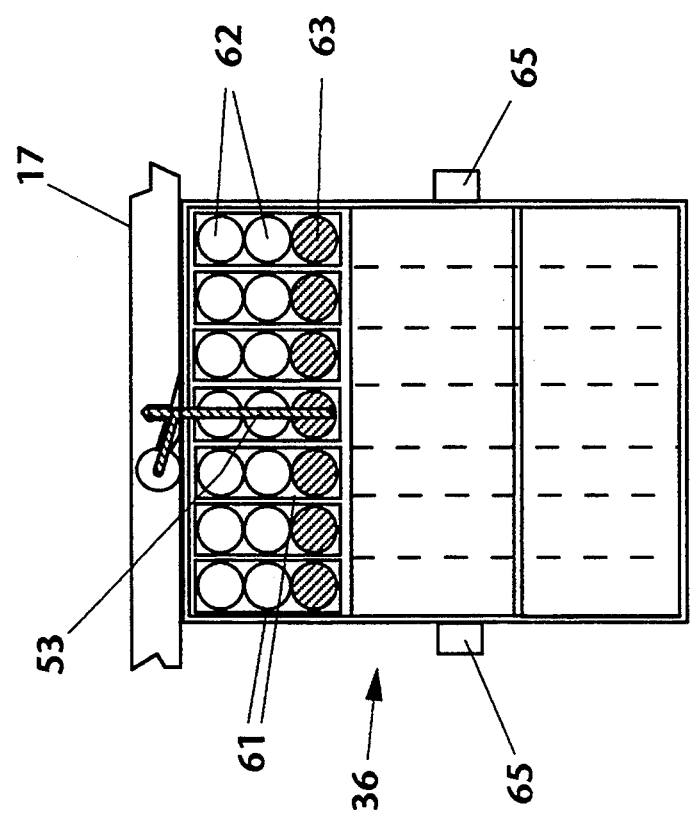
Figure_5

APPARATUS FOR IMPLANTING LATENT INSECTICIDE

BACKGROUND OF THE INVENTION

Although the elephant is recognized as the largest land animal, the animal that comprises the largest mass in the animal kingdom is the termite. Despite the small size of individual kalotermes and reticulitermes, they are so numerous throughout the world that their total mass far exceeds any other animal. Termites exist by eating wood and other cellulose-containing materials. They are social insects that live in organized colonies located within dark, closed, humid spaces. Termites tend to remain within one area until population growth and success of the colony requires migration to areas with additional food supply.

Due to their large numbers and their habit of consuming structural wood, termites are responsible for enormous damage to buildings. Often the damage to individual buildings is not noticed until it is visible at exterior or interior surfaces, and by the time damage is visible it has usually progressed to the point of structural degradation. Generally speaking, structural pest control reports carried out upon transfer of property title are the only regular means of detecting termite damage and correcting it. The cost of this effort amounts to billions of dollars annually in the United States alone.

Localized infestations of termites can be controlled by drilling into the affected wood and blowing poison dust into the holes. This method scatters poison in the air and leaves poison residue in the wood, and may result in long-term toxic effects to the occupants of the building. A preferable method developed recently involves placing a large, gas-tight tent over the building, and filling the building with a powerful reducing gas, such as methyl bromide, that kills all living things within the building. The drawback of this method is that it provides no long-term prevention of re-infestation.

The termite is unique in its ability to digest cellulose, due to the presence of flagellate protozoa in the gut of the termite that break down cellulose into digestible substances. Without the flagellae, termites cannot survive.

There is no practical method or apparatus in the prior art for preventing termite infestation. Efforts have focused on devices for blowing poison dust or gas into wall spaces or into blown-in insulation, but this technique puts the building occupants at risk for poison ingestion from long-term exposure.

SUMMARY OF THE PRESENT INVENTION

The present invention generally comprises a method and apparatus for arresting structural termite infestation while eliminating the risk of poison exposure to occupants of the structure. The invention provides long-term protection against extensive damage at low cost.

The apparatus of the invention comprises a power tool for drilling holes in wood members of a structure, implanting pellets of termite poison within the drilled holes, and sealing the holes. The tool includes a tubular body portion joined to a storage portion that stores a plurality of packages of pellets of termite poison. A platen assembly is secured to the storage portion and adapted to impinge on a wood member of a structure. The tubular body encloses a reversible drive motor connected to a gear train. A drill bore extends from the tubular body through the storage housing and the platen, and a drill assembly is translatably received with the bore. The drill assembly includes a distal drill tip and a proximal end having a helical gear portion. The helical gear end of the drill assembly meshes with the gear train, so that operation of the drive motor rotates the drill and translates the drill assembly reciprocally in the bore. Thus the drill may be advanced to form holes in wood and the like. A chip removal auger is disposed adjacent to the distal end of the bore, and is driven by a secondary electric motor to remove drill chips and dust from the tool.

The termite poison is prepackaged in units comprising a plurality of cellulose balls impregnated with poison or insecticide or flagellacidal agents. The cellulose balls are packaged in axial alignment and secured in the tool extending parallel to the bore. A plug cork is disposed at the proximal end of the load of cellulose balls. As an example, the storage portion of the tool may comprise a container for 21 packages of 10 loads each, each load including two cellulose balls impregnated with termite killing agents and one plug cork. The plug cork is formed of a deformable substance that is sufficiently hard to withstand the perforating effect of the drill tip.

The tool platen includes a medial rectangular plate and a pair of integral arms extending contiguously in opposed fashion from the plate, the plate and arms having a continuous planar surface adapted to impinge on the surface of a wood member. A pair of lugs extend from opposed ends of the opposed arms, and are provided with knife points or barbs disposed to pierce the opposed side surfaces of the wood member, such as a wall stud, and temporarily support the tool on the wood member.

To use the tool of the invention, the platen is placed against the face of a wood member, and the opposed arms are swung in an arc to drive the points of the lugs into the sides of the wood member, anchoring the tool to the member. The drive motor is then activated to rotate and advance the drill assembly, forming a hole in the wood. The drill is retracted into the tool by reversing the drive motor, permitting a spring feed to urge a charge or load from the storage housing into the path of the drill. The drive motor is then activated again, advancing the drill tip against the proximal end of the load and pushing the load into the hole drilled previously. The drill is advanced partially into the drilled hole a sufficient distance to drive the load into the distal end of the hole, rupture the load package and crush the cellulose balls, the proximal plug cork deforming to seal the hole. The motor is then reversed to withdraw the drill assembly into the tool, and the tool is removed from the temporary anchoring on the wood member and moved to a new location.

The method of the invention generally includes forming a hole in a wood member, placing pellets containing insect killing agents within the hole and sealing the hole so that no poison can escape. The insect killing agents remain latent and enclosed within the wood member, so that occupants of the structure are protected from any toxic contact and only insect infestation can gain access to it. The method is particularly applicable to arresting termite infestation, although it is not limited to such use. The method of the invention also includes prepackaging termite killing agents as a load or charge comprising a plurality of pellets in axial alignment with a plug cork disposed at the proximal end of the charge. The method also includes dimensioning the pellets and plug cork with respect to a drilled hole so that the pellets are implantable in the drilled hole and the plug cork seals the drilled hole to retain any toxic substances for long-term protection from termite-caused structural damage.

BRIEF DESCRIPTION OF THE DRAWING

FIG. 1 is a perspective view of the tool of the invention for drilling holes in construction materials, placing insecticide such a termite killing agents into the holes, and sealing the holes.

FIG. 2 is a top view of the tool depicted in FIG. 1.

FIG. 3 is a partially cross-sectioned top view of the tool shown in FIGS. 1 and 2.

FIG. 4 is an end view of the tool of FIGS. 1–3, showing the platen construction of the tool.

FIG. 5 is a top view of the load storage arrangement in the tool of the present invention.

FIG. 6 is an end view of the load storage package used in the tool of the present invention.

FIG. 7a–7d are a sequence of views depicting the method of the invention as carried out by the tool of the invention.

DESCRIPTION OF THE PREFERRED EMBODIMENT

The present invention generally comprises a method and apparatus for implanting latent insecticide in structures and objects to arrest insect infestation. Although the invention will be described with respect to the arresting termite infestation in buildings and structures, it may be applied to arrest termite, beetle, and insect infestations of trees, and may be applied to other objects and structures.

With regard to FIG. 1, the apparatus of the invention includes a tool 11 adapted for implanting latent insect-killing agents in a structure or object. The tool includes a tubular housing 12 having a handle 13 extending proximally therefrom, and a storage housing 14 joined to the distal end of the housing 12. The storage housing 14 is adapted to retain a large plurality of prepackaged loads of insect-killing agents, as will be described in the following specification. Joined to the distal end of the storage housing is a platen assembly 17, which is adapted to impinge on a surface of the object being treated by the tool. A drill bore 18 extends through the platen to permit the extension of a drill bit therefrom. A normally open pressure contact switch 19 is secured to the platen assembly 17, and connected so that the tool motors can operate only when the platen is impinging against the object to be treated.

With regard to FIGS. 2 and 3, the tubular housing 12 encloses and supports a reversible electric motor 21. Secured to the output shaft 22 of the motor 21 is a gear 23, which in turn meshes with a drive gear 24 supported by thrust bearings. The drive gear 24 includes a bore extending axially that is provided with internal, helical teeth. The drive gear bore is aligned with a drill guideway 26 extending into the housing 12 and disposed coaxially with the drill bore opening 18 in the platen assembly 17. A drill assembly 27 is disposed within the drill guideway 26 in freely translating fashion. The drill assembly 27 comprises a distal drill bit portion 28 and a proximal portion 29 having external helical gear teeth extending therealong. The portion 29 extends through the bore of the drive gear 24 and the external helical teeth of the portion 29 mesh with the internal helical teeth of the drive gear 24. Thus it may be appreciated that actuation of the motor 21 will drive the gear train, causing the drive gear to both rotate the drill assembly 27 and translate the drill assembly reciprocally in the guideway 26.

Disposed within the storage housing 14 adjacent to the drill guideway 26 and the interior surface of the platen assembly 17 is an auger 31. The auger 31 is driven continuously by an electric motor 32 to remove drilling chips and debris from the area adjacent to the drill assembly and discharge the chips and debris from waste opening 33. The storage housing 14 also includes a coffer 34 for holding a plurality of containers 36 of prepackaged loads of insect-killing agents. A spring 38 secured within the coffer is disposed to urge the containers distally toward the platen assembly 17.

With regard to FIGS. 1–4 taken together, the platen assembly includes a rectangular medial portion 41 adapted to impinge on a wood beam or the like to be treated. The drill bore 18 extends through the medial portion adjacent to the contact sensitive switch 19, as described previously. A pair of integral arms 42 and 43 extend contiguously from opposed ends of the medial portion 41 and are laterally offset from an end-to-end centerline of the medial portion. The arms and medial portion define a continuous planar surface. A pair of lugs 44 and 46 are also provided, each lug 44 and 46 extending orthogonally from the planar surface of a respective one of the arms 42 and 43. The lugs are disposed at laterally opposed sides of the pair of arms, an arrangement that permits the lugs to impinge on opposed sides of an exemplary beam 47 impinged against the platen assembly. A pair of barbs or knife points 48 extend from respective lugs 44 and 46 in convergent fashion, and are arranged to anchor into the sides of a beam against which the medial portion 41 of the platen assembly is impinged. Thus the tool may be temporarily self-supported on the beam or similar object being treated.

A feed mechanism is also provided to deliver the individual charges or loads 39 from the container 36 to the distal end portion of the drill guideway 26. The feed mechanism includes a slot 50 extending longitudinally in the arm 42 from the outer end thereof to the drill bore 18. A driver 51 is secured in the slot 50, and includes a rod-like portion 52 having an orthogonal pusher portion 53 extending from the inner end thereof. The pusher 53 is dimensioned to engage the outermost package in the container 36, and to urge the column of packages 39 toward the drill guideway 26. At the outer end of the driver 51 a handle loop 54 is integrally formed. A spring arrangement (not shown for graphic simplicity) is provided to resiliently urge the driver assembly toward the drill guideway 26. Thus as the loads 39 are dispensed and implanted, and will be described in the following specification, the column of loads is advanced toward the drill guideway 26 until the package is exhausted. A new package in then moved into place to be engaged by the driver 51.

With regard to FIGS. 5 and 6, the container 36 of the invention for storing and dispensing the charges or loads 39 of insecticide comprises a generally rectangular housing dimensioned to be received within the coffer 34. The container 36 is provided with a pair of spring clip devices 65 for securing the container in the tool portion 14. The loads are disposed in packets 61 formed of a soft, tearable material such as paper or thin polymer plastic. In the preferred embodiment, each packet 61 contains 30 balls or pellets arranged in a matrix of 10 columns by 3 rows. Each column of three units comprises two balls 62 impregnated with an insecticide and one plug cork 63 disposed at the proximal end of the column. For termite extermination, the two balls 62 may be formed of cellulose impregnated with poison specific to termites or to the flagellates contained within the termite digestive tract. The plug cork 63 may be formed of a deformable, resilient substance such as solid polymer plastic, wax, or the like. Each packet 61 includes a pull-tab 64 to facilitate manual removal when the packet is exhausted. Adjacent packets 61 are then moved distally by manual means or spring means to present a fresh, unused packet of loads in a dispensing position to the driver 51, which is retracted after each packet is exhausted. In the preferred embodiment, the container stores 21 packets of 10 loads each.

The method of the present invention will be described with reference to the tool described above and the pelletized, implantable insecticide describe above. First, the tool 11 is disposed adjacent to a wooden beam 47 or the like, the platen medial portion 41 impinging on the beam. The tool is then rotated clockwise about an axis generally coaxial with the axis of the tubular housing 12, so that the barbs or knife points 48 are driven into the opposed sides of the beam 47, temporarily anchoring the tool 11 to the beam with the platen impinging on the beam (see FIG. 7a). The motors 21 and 32 are started by a manual switch (not shown). The motor 21 rotates gears 23 and 24, causing the drill assembly 27 to rotate clockwise and advance distally in the drill guideway 26. The drill tip 28 extends from the tool 11 through the bore 18 and drills a hole 71 in the beam 47 (FIG. 7b).

When the drill assembly reaches a depth stop (not shown), the motor 21 is stopped and reversed, causing the drill assembly 27 to counterrotate and retract into the guideway 26. The drill chips and debris are pulled from the hole 71 by the retracting drill, and the auger 31 removes the chips and debris through port 33. The drill assembly is retracted a sufficient distance into the guideway to provide clearance for a load from the packet 61 in the dispensing position to be delivered by the driver 51 into the distal end of the drill guideway (FIG. 7c). Thereafter, the motor 21 is activated again to advance the drill assembly and push the load into the drilled hole 71. The load is dimensioned so that the balls or pellets 62 slide easily into the hole 71, driven by the plug cork 63, and are translated to the distal end of the hole. The drill assembly is advanced a measured distance to crush the pellets or balls 62, and to compress the plug cork slightly and expand it laterally to seal the plug cork 63 in the hole 71. Thus the impregnated pellets or balls are implanted in the distal end of the hole and sealed therein in the final operation, as shown in FIG. 7d. The drill assembly is then withdrawn by reversal of the motor 21 to a position shown in FIG. 7a, and the tool 11 is moved to a new location for further treatment of the wood member. The process is then reiterated.

It may be noted that the poison impregnated pellets are disposed and sealed deep within the wood, where they are protected from water and air. Thus the poison cannot be spread nor leaked into the building or structure, providing a high safety factor for occupants of the building. Only wood-boring or consuming insects such as termites and beetles can gain access to the poison pellets. The treated wooden beams can be covered, finished, painted, shingled, and the like without affecting the latent insecticidal potential of the implanted poison.

Termites have a habit of grooming each other as they pass through their passages in the wood, and this habit promotes the transfer of the poison from the pellets to the larger colony located some distance from the advancing termite infestation. Therefor, the poison can have a great effect on a termite colony, even though only a small amount is implanted in any one location.

The impregnated pellets may be formed using prior art pharmaceutical encapsulation techniques, resulting in low cost for each pellet and the packaged loads. Using the apparatus and method of the invention, it is possible for one worker to treat an average dwelling under construction in one day, at a cost far less than the expense of attempting to remove or treat a termite infestation after it has progressed to the point of being visible.

It should be noted that the size, shape, and number of pellets or balls forming the loads implanted in the wood are not limited by the description herein. The loads may comprise unitary cartridges rather than assemblies of pellets. In addition, the limit switches and depth stops incorporated in the tool of the invention, which comprise standard items in the prior art, have not been shown for purposes of descriptive simplicity.

I claim:

1. An assembly for implanting latent insecticide within a structural object, comprising;
   means for storing a plurality of insecticide loads;
   feed means for advancing said insecticide loads individually to a dispensing station within said assembly;
   means for drilling a hole in the structural object and advancing the insecticide load at said dispensing station into said hole and sealing said hole.

2. The assembly of claim 1, wherein said means for drilling a hole includes a drill assembly having a distal drilling end, and drive means for rotating said drill assembly reversibly about a longitudinal axis and translating said drill assembly reversibly along said longitudinal axis.

3. The assembly of claim 2, wherein said drill assembly includes a proximal portion having external helical gear teeth, and said drive means includes a drive gear having internal helical gear teeth adapted to mesh with said external helical gear teeth.

4. The assembly of claim 3, wherein said drive means further includes a reversible motor connected to rotate said drive gear.

5. The assembly of claim 2, further including a drill guideway extending in said apparatus and including a distal end opening and a proximal internal end, said drill assembly being disposed in slidable fashion in said drill guideway, and said distal end of said drill assembly being translatable reciprocally between an extended position from said distal end opening of said drill guideway and a retracted position within said drill guideway.

6. The assembly of claim 5, wherein said dispensing station of said feed means includes a distal end portion of said drill guideway.

7. The assembly of claim 6, wherein said plurality of insecticide loads are stored in stacked, column fashion, and said feed means includes a pusher assembly for urging said stacked column toward said dispensing station.

8. The assembly of claim 7, wherein said dispensing station may receive the end-most load of column of insecticide loads only when said drill assembly is disposed in said retracted position.

9. The assembly of claim 8, wherein said pusher assembly includes a pusher member for impinging on one end of said stacked column of said insecticide loads, and means for urging said pusher member toward said dispenser station.

10. The assembly of claim 5, wherein said assembly further includes a platen assembly for impinging on the structural object, said distal end opening of said drill guideway being disposed in said platen assembly.

11. The assembly of claim 10, wherein said platen assembly includes a medial portion and a pair of integral arms extending contiguously from opposed ends of said medial portion to define a continuous planar surface.

12. The assembly of claim 11, wherein said platen assembly further includes a pair of lugs extending generally orthogonally from opposed sides of said pair of arms and disposed to engage the structural object therebetween.

13. The assembly of claim 12, further including barb means extending in convergent fashion from said lugs to pierce and releasably retain the structural object.

14. The assembly of claim 5, further including means for removing drill chips and debris from said assembly.

15. The assembly of claim 14, wherein said means for removing includes an auger disposed adjacent to said drill guideway.

16. The assembly of claim 1, wherein said means for storing includes a container, said plurality of loads disposed in said container in a plurality of stacked columns, said columns disposed in adjacent fashion.

17. The assembly of claim 16, wherein said feed means includes spring means for impinging on said columns and urging said columns toward a distal end of said container.

18. The assembly of claim 17, wherein said feed means further includes a pusher assembly for engaging the distal column of insecticide loads at said distal end of said container and urging said distal column toward said dispensing station.

19. The assembly of claim 16, wherein each of said loads includes a first portion impregnated with insecticide and a second portion adapted to seal the drilled hole into which the load is implanted.

20. The assembly of claim 19, wherein said first portion of said load comprises two pellets of cellulose-containing material impregnated with a substance toxic to termites.

* * * * *